April 15, 1969  D. B. WINCHESTER ETAL  3,439,248
TRIGGER-ACTUATED MOTOR SPEED CONTROL AND SWITCHING DEVICE
HAVING MULTIPLE SELECTIVE POSITIONS FOR
SETTING MOTOR SPEEDS
Filed Jan. 4, 1966  Sheet 1 of 2
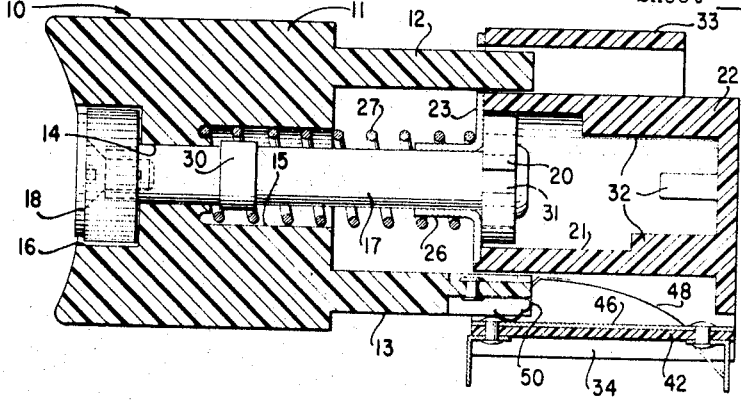
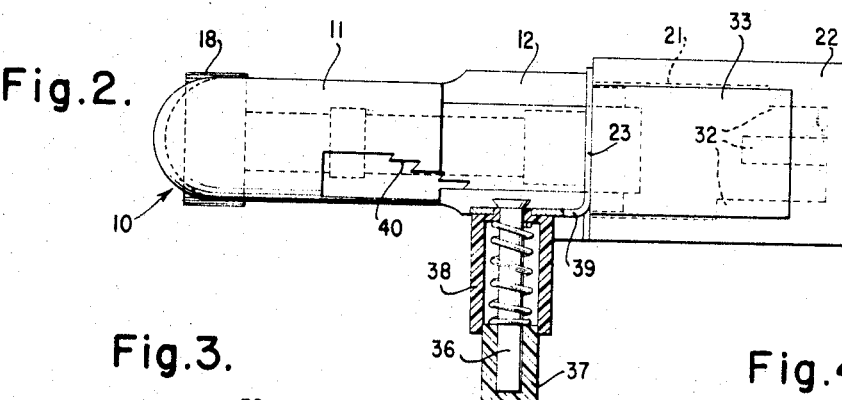
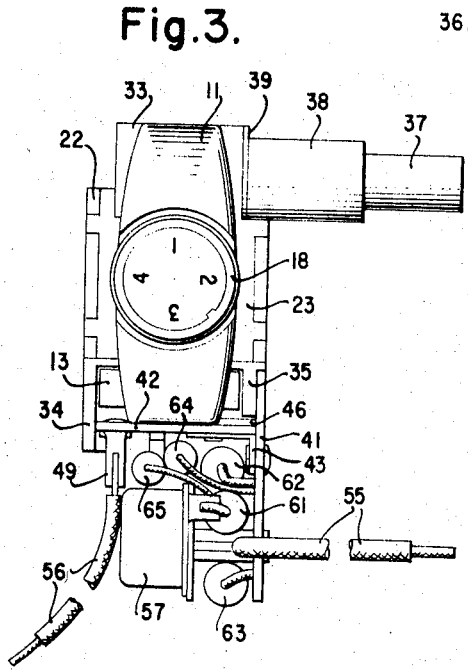
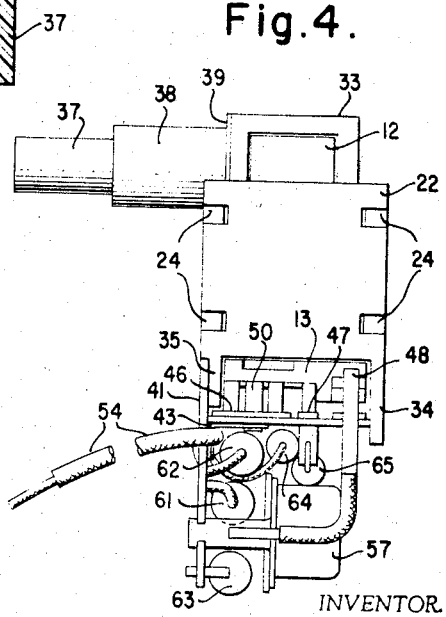
INVENTOR.
Don B. Winchester
And William A. Batson
BY
ATTORNEY
Witness
Rosalind Tsai April 15, 1969 D. B. WINCHESTER ET AL 3,439,248
TRIGGER-ACTUATED MOTOR SPEED CONTROL AND SWITCHING DEVICE
HAVING MULTIPLE SELECTIVE POSITIONS FOR
SETTING MOTOR SPEEDS
Filed Jan. 4, 1966 Sheet 2 of 2
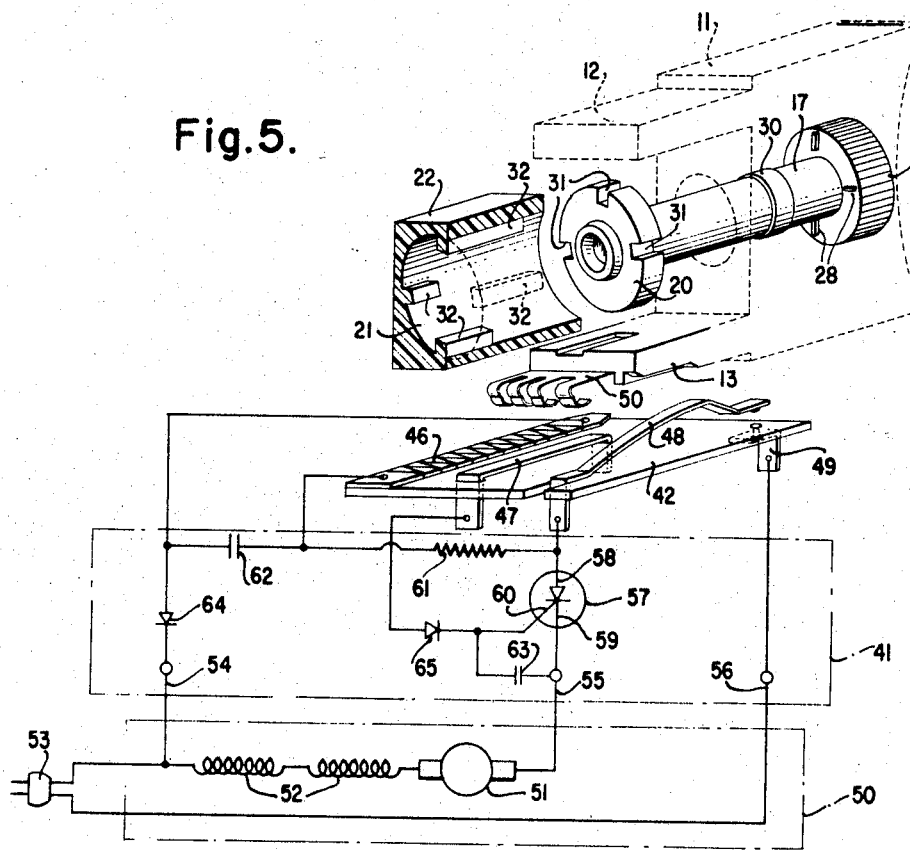
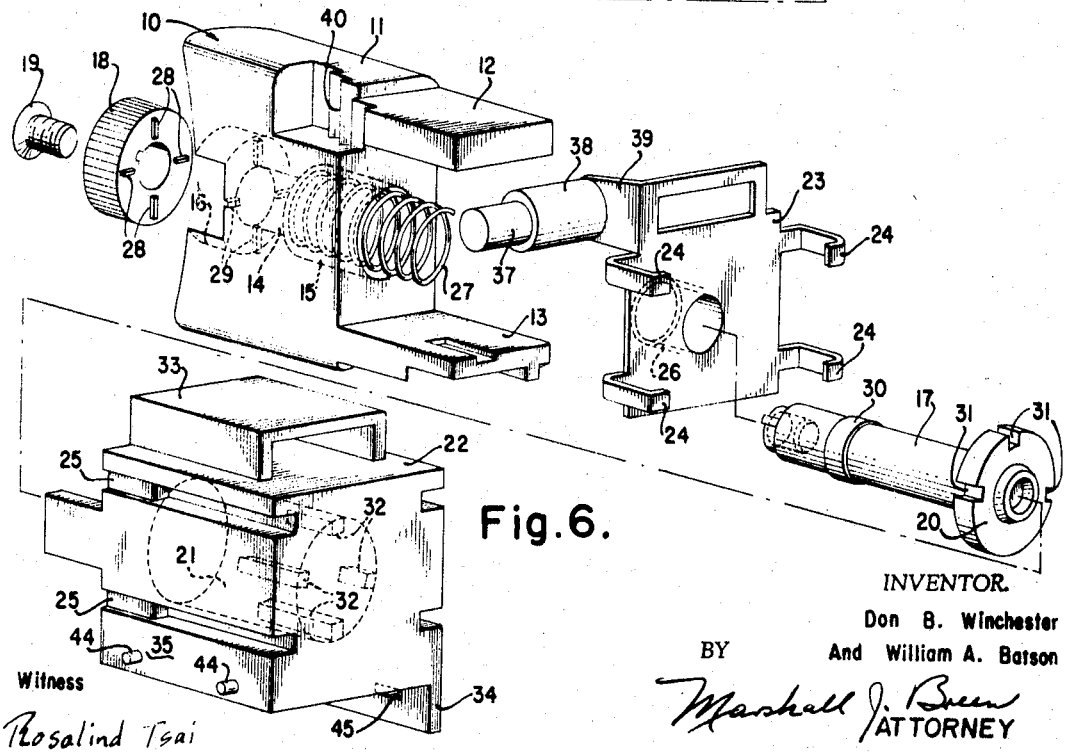
INVENTOR.
Don B. Winchester
And William A. Batson

United States Patent Office 3,439,248
Patented Apr. 15, 1969

3,439,248
TRIGGER-ACTUATED MOTOR SPEED CONTROL AND SWITCHING DEVICE HAVING MULTIPLE SELECTIVE POSITIONS FOR SETTING MOTOR SPEEDS
Don B. Winchester and William A. Batson, Pickens, S.C., assignors to The Singer Company, New York, N.Y., a corporation of New Jersey
Filed Jan. 4, 1966, Ser. No. 518,649
Int. Cl. H02k *27/20;* H02p *5/00*
U.S. Cl. 318—331      3 Claims

ABSTRACT OF THE DISCLOSURE

A trigger actuated motor speed control providing automatic speed regulation and also providing speed selection. A speed-responsive feedback system is utilized to automatically correct for speed changes due to load changes in combination with a finger operated element having multiple selective stop positions corresponding to predetermined speeds.

---

This invention relates to a unitary control device adapted to be connected electrically to a source of A.C. voltage and to a series electric motor to provide an automatic speed responsive regulating function and an "on-off" switching function combined with a speed-selecting function for said motor responsively to the movement of an operator-actuated element. More particularly, this invention relates to a unitary control device of the above type having multiple selective stop positions for said operator-actuated element corresponding to a predetermined regulated speeds of the motor.

It has been suggested by the prior art that a nonfeedback type of control circuit can be successfully used in a portable electric tool if the speed is under the sole control of a finger-operated trigger. The assumption here is that the operator can supply the feedback link to vary the control element as desired to hold the speed at some optimum value regardless of load changes. As a practical matter, however, it is doubtful if the normal human reaction is fast enough to detect and correct for a sudden load change as is inherently necessary in the above type of system.

It is a fact of experience that, with such prior art systems, for sudden increase in load, the motor stalls and for sudden decrease in load, the motor runs away before the operator can take corrective action and this is not productive of satisfactory tool operation.

It is therefore a basic concept of the present invention to employ a speed-responsive feedback system automatically to correct for speed changes due to load changes in combination with a finger-operated element which merely selects a desired predetermined base speed which the speed-responsive system automatically maintains within its capability. Thus, there is here no reliance placed on the doubtful human ability of the operator to pull a trigger just fast enough and far enough to correct for load changes. This speed-responsive regulation is accomplished automatically according to this invention by a speed signal fed back from the motor itself during each positive half cycle of the A.C. voltage. All the operator is required to do in the system of the present invention is to select a desired speed and that speed can be changed with facility as often as desired.

With practical trigger movement limited to a maximum of about 3/8 inch, it is humanly difficult to hold the trigger steady at fractional movements corresponding to the desired intermediate regulated speeds. This difficulty is overcome according to this invention by providing multiple selective stop positions for the trigger and selective means for locking the trigger in these positions if desired. Thus, the tool is readily adapted for low, intermediate, or high speed operation and no special skills or new operating techniques are required for satisfactory operation.

It is an object of this invention, therefore, to combine, in a unitary control device of small size, structure providing an automatic speed-responsive regulating function with structure providing an "on-off" switching function and a speed-selecting function for the motor responsively to the movement of an operator-actuated trigger element.

It is a further object of this invention to provide, in a unitary control device, a built-in circuit module for automatically regulating the selected motor speed responsively to a speed feedback signal obtained from the motor.

It is a still further object of this invention to provide multiple selective stop positions for the trigger element corresponding to predetermined regulator motor speeds.

It is another object of this invention to provide means for selectively locking said trigger element in any one of said stop positions.

It is another object of this invention to provide all of the above functions in a single compact device having only three electrical terminals to facilitate its assembly in a device preferably of the portable electric tool type.

With the above and other objects in view, as will hereinafter appear, the invention comprises the devices, combinations and arrangements of parts hereinafter set forth and illustrated in the accompanying drawings of a preferred embodiment of the invention, from which the several features of the invention and the advantages attained thereby will be readily understood by those skilled in the art.

In the drawings, FIG. 1 is a longitudinal sectional view taken through a device embodying the invention.

FIG. 2 is a top plan view, partly in section, of the device of FIG. 1,

FIG. 3 is a front end elevational view of the device of FIG. 1,

FIG. 4 is a rear end elevational view of the device of FIG. 1,

FIG. 5 is a diagrammatic representation of the device of FIG. 1, showing the relation of the mechanical components with the electrical circuit arrangement, FIG. 6 is a disassembled perspective view of the device of FIG. 1 with the circuit boards removed for clarity.

Referring now to FIGS. 1 and 6, a trigger 10, made of molded insulating material, has a body portion 11 with two extending leg portions 12 and 13. The body portion 11 contains a through-bore 14 and two counter bores 15 and 16. A speed dial shaft 17 is slidingly received in the through-bore 14 and a speed dial knob 18, keyed to one end of shaft 17, is secured thereto by means of screw 19. A dial disc 20 keyed to the other end of the shaft 17 is secured thereto by upsetting the end of said shaft. The dial disc 20 is free to slide and turn within a bore 21 formed in a stationary insulated housing 22. A metal cover 23 is secured to the housing 22 by means of lugs 24 which are bent to engage recessed bosses 25 formed on the housing 22. The cover 23 is formed with a bushing portion 26 in which is slidably received the shaft 17. A compression spring 27 surmounts the shaft 17 and is seated at one end in the bottom of bore 15 and at the other end against the cover 23.

The spring 27 biases the trigger 10 to its normal unoperated extended position shown in FIG. 1. Formed on the bottom surface of the dial knob 18 are four radial ribs 28 equally spaced circumferentially. The ribs 28 cooperate with four radial grooves 29 formed in the bottom of bore 16 to provide means for rotatably indexing the shaft 17 about its axis in 90 degree steps for a purpose to be described presently. A step portion 30 formed on the shaft 17 provides limited axially motion of the trigger 10 relative to the shaft 17 to permit disengagement of the ribs 28 and grooves 29 when indexing.

It will be noted that the bore 16 cuts through the sides of the trigger 10 to expose peripheral portions of the knob 18 which is knurled to facilitate finger adjustment thereof. The dial disc 20 is formed with three peripheral slots 31 spaced at 90 degrees which cooperate with four ribs 32 formed on the interior wall of the housing bore 21 to permit or impede axial movement of the trigger 10 depending on the alignment of the slots 31 with selected ribs 32. The ribs 32 extend from the bottom of bore 21 to different axial distances as shown to provide four bottoming stops for the disc 20 selectible by indexing the knob 18 as explained above.

The housing 22 is formed with a covered slotted portion 33 for receiving the leg 12 in linear sliding engagement. Skirt portions 34 and 35 formed on the housing 22 provide an open slot for receiving the other leg 13 of the trigger 10 in sliding engagement therewith.

A spring-retracted lock pin 36 actuated by a lock button 37 working in a guide bushing 38 secured to a bracket portion 39 of the cover 23 cooperates with a "stairstep" cam 40 formed in the trigger 10 to provide means for locking the trigger 10 in any one of the bottoming positions selected by the knob 18. Instant release of the trigger 10 is provided by merely depressing the trigger until the lock pin 36 clears the "stairstep" cam 40.

As thus far described, there has been provided according to this invention a trigger linearly movable with respect to a stationary housing to different predetermined bottoming positions, each position being manually selectible by indexing means located on the trigger and including means for selectively locking said trigger in any one of said positions.

There will now be described further structure built into the trigger structure above and providing means for automatically regulating the motor speed, together with switching means for isolating the motor from the supply voltage and for selecting a regulated speed for the motor responsively to movement of the trigger. This additional structure essentially comprises two combined preassembled circuit boards or modules secured to the housing 22.

A side circuit board 41 carrying fixed electrical components forming a speed regulating circuit is joined to a top circuit board 42 carrying the switching and speed setting components by means of an angle bracket 43 secured to both boards. The assembled boards 41 and 42 are then secured to the housing 22 by cementing board 41 to the skirt portion 35 using pins 44 for locating. The top board 42 is formed with lugs (not shown) which fit within apertures 45 made in the skirt portion 34. One of these apertures 45 is shown in FIG. 6.

As shown best in FIG. 5, the top circuit board 42 has secured to it a flat strip resistor 46, a bus-bar 47, a leaf spring switch arm 48 and a contact bracket 49. These components may be secured to the board 42 by any suitable means such as by riveting or pushing through apertures and bending, the important point being that they are arranged in spaced parallel relation with each other and with the direction of trigger movement. Secured to leg 13 of the trigger 10 is a resilient conducting bridging contact 50 which makes a sliding electrical connection between the resistor 46 and the bus-bar 47 as the trigger moves. A portion of leg 13 provides an insulated cam surface which cams the leaf switch arm 48 into electrical contact with the bracket 49 after small initial movement of the trigger 10 and holds this contact closed for subsequent depression of the trigger.

The components mounted on the side circuit board 41 are indicated diagrammatically in FIG. 5 in an exemplary circuit configuration which provides an automatic speed-regulating function responsively to speed signals fed back from a motor 50 comprising an armature winding 51 in series with a field winding 52 and a line cord plug 53 adapted to be connected to a regular A.C. supply voltage (not shown).

It will be noted that the device of this invention provides only three terminal leads 54, 55 and 56 for electrical connection to the motor 50 and to the line plug 53 to provide a completely operative system and greatly simplifies the assembly of this control device into the housing of a portable electric tool.

The components mounted on board 41 comprises a silicon controlled rectifier 57 having an anode 58, cathode 59 and gate 60, a fixed resistor 61, capacitors 62 and 63, and diodes 64 and 65.

OPERATION

Referring to FIG. 5, the arrangement of the parts is such that, with the trigger 10 in the extended unoperated position of FIG. 1, the leaf switch arm 48 is *not* contacting the contact bracket 49 and the device is isolated from one side of the A.C. supply voltage. This corresponds to the open circuit or "off" position of the device, and there is no danger of starting the motor due to line transients. In this position of the trigger 10, the bridging contact 50 makes contact with the strip resistor 46 but *not* with the bus-bar 47. When it is desired to operate the motor at a predetermined regulated speed, the operator first dials the speed desired by manipulation of the speed setting knob 18, being guided by the numbers appearing on the end of said knob as shown in FIG. 3, and then pulls the trigger 10 and the following events occur in sequence:

First, the insulated cam surface of leg 13 cams the leaf switch arm 48 into electrical contact with contact bracket 49. This applies the A.C. line voltage from plug 53 across the series circuit comprising anode 58, cathode 59, armature winding 51 and field winding 52. At this point, the bridging contact 50 is in contact with resistor 46 but *not* with the bus-bar 47 so that no voltage is applied to the gate 60 and the silicon controlled rectifier is in its blocking state and no motor current will flow. Further depression of the trigger 10 brings the bridging contact 50 into contact with the bus-bar 47 and connects the gate 60 through diode 65 to a point on the resistor 46. On the first half cycle of positive anode voltage, current will flow into the gate 60 to turn on the rectifier 57 and supply power current to the motor which will then accelerate. The trigger will be depressed to a bottoming position determined by the dial disc 20 coming to rest against one of the ribs 32 preselected by the dial knob 18. This position of the trigger 10 may if desired be locked by depression of the lock button 37 to engage the locking pin 36 with the "stairstep" cam 40 as explained above. This bottoming position of trigger 10 will correspond to a definite predetermined position of the bridging contact 50 on resistor 46 which determines the voltage available for supplying firing current to the gate 60. The armature winding 51, being in series with the gate 60 and the cathode 59, generates a speed voltage which opposes the voltage derived above from the setting of the resistor 46 and the motor will accelerate until these voltages balance to supply just enough gate firing current to provide motor current to satisfy the load demand. The motor will thus reach a constant balancing speed determined by the trigger position and the load and will run at this speed. Subsequent load changes, within limits, will not greatly alter the speed thus set because of the inherent automatic speed regulating function supplied by the biasing speed voltage fed back from the armature winding. For example, if the speed tends to drop due to increased load demand, the biasing speed voltage decreases immediately to apply a larger net gate voltage to advance the firing point of the rectifier 57 to supply the increased current demanded by the increased load. This speed corrective action is substantially instantaneous and automatic and occurs independently of the setting of the trigger 10.

It will be noted that the sequential delayed switching operation of the leaf switch arm 48 with respect to that of the bridging contact 50 with bus-bar 47 follows the method shown and described in the copending United States application No. 391,589 filed August 24, 1964, now United States Patent No. 3,372,288, and assigned to the same assignee as the present invention.

From the above it will be apparent that there is provided according to this invention a compact three-terminal trigger-actuated speed control unit capable of easy installation in a portable electric-motor powered tool and providing in one package means for selectively isolating the motor from the A.C. supply voltage, means for selecting predetermined maximum travel movements of an operator-controlled trigger corresponding to predetermined set motor speeds, means for selectively locking the trigger in position at the ends of said movements and means for automatically regulating the speed of the motor responsively to speed feedback signals from the motor itself.

Having thus set forth the nature of this invention, what we herein claim is:

1. A unitary three-terminal device adapted to be connected to an A.C. voltage source and to a series electric motor to provide an "on-off" switching function and a speed-selecting function for said motor responsively to the movement of an operator-actuated element comprising a stationary housing, a trigger slidable in said housing, means formed on said housing providing a plurality of bottoming stop positions for said trigger, means carried by said trigger for selecting any one of said stop positions, a circuit module secured to said housing for regulating the speed of said motor responsively to a speed feedback signal from said motor, switch means for electrically connecting one of said terminals to said circuit module, variable resistor means for setting a motor speed, contact means for rendering said resistor means effective to control the motor speed, and means responsive to movement of said trigger to actuate said switch means and said contact means in a sequential manner and to vary said resistor means to select a predetermined motor speed.

2. A unitary three-terminal control device adapted to be connected electrically to a source of A.C. voltage and to a series electric motor comprising a stationary housing, a trigger slidable in said housing, means formed on said housing providing a plurality of bottoming stop positions for said trigger, means carried by said trigger and cooperating with said housing means for selecting any one of said stop positions, a circuit module secured to said housing and providing automatic speed regulation of said motor responsively to speed signals fed back from the motor, one of said circuit module components being a variable resistance element controlled in response to trigger movement to select a motor speed corresponding to any one of said stop positions.

3. Speed control means adapted to be electrically connected to a source of A.C. voltage and to a series electric motor, including a trigger adapted to be actuated to its maximum travel by the finger of an operator, means forming a plurality of different stop abutments limiting the maximum travel of said trigger, means for selecting any one of said stop abutments, and a plurality of electrical components connected together and defining an automatic speed regulating circuit responsive to speed signals fed back from the motor, one of said components comprising a variable resistance element controlled in response to trigger movement to select a motor speed corresponding to any selected one of said trigger stop abutments.

References Cited

UNITED STATES PATENTS

| | | | |
|---|---|---|---|
| 3,085,169 | 4/1963 | Abel | 310—68 |
| 3,221,192 | 11/1965 | Franklin | 310—68 |
| 3,222,583 | 12/1965 | Gutzwiller | 318—331 X |
| 3,302,088 | 1/1967 | Wigington | 318—331 X |
| 3,327,196 | 6/1967 | Sahrbacker | 318—345 |
| 3,328,613 | 6/1967 | Gawron | 318—345 X |
| 3,329,842 | 7/1967 | Brown | 318—345 X |

ORIS L. RADER, *Primary Examiner.*

G. NUNEZ, *Assistant Examiner.*

U.S. Cl. X.R.

310—50, 68; 318—349